(12) United States Patent
Hildebrand et al.

(10) Patent No.: US 9,235,482 B2
(45) Date of Patent: Jan. 12, 2016

(54) CONSISTENT DATA RETRIEVAL IN A MULTI-SITE COMPUTING INFRASTRUCTURE

(75) Inventors: Dean Hildebrand, San Jose, CA (US); Aameek Singh, San Jose, CA (US); Renu Tewari, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 13/097,791

(22) Filed: Apr. 29, 2011

(65) Prior Publication Data

US 2012/0278283 A1 Nov. 1, 2012

(51) Int. Cl.
*G06F 17/30* (2006.01)
*G06F 11/20* (2006.01)

(52) U.S. Cl.
CPC .......... *G06F 11/203* (2013.01); *G06F 11/2046* (2013.01); *G06F 11/2041* (2013.01); *G06F 11/2097* (2013.01); *G06F 2201/82* (2013.01)

(58) Field of Classification Search
CPC ................................................ G06F 17/30575
See application file for complete search history.

(56) References Cited

U.S. PATENT DOCUMENTS

| | | | |
|---|---|---|---|
| 7,028,079 B2 | 4/2006 | Mastrianni et al. | |
| 7,392,421 B1 | 6/2008 | Bloomstein et al. | |
| 7,464,238 B1 * | 12/2008 | Yadav | 711/162 |
| 7,788,524 B2 | 8/2010 | Wing et al. | |
| 2005/0071421 A1 * | 3/2005 | Calo et al. | 709/203 |
| 2005/0091388 A1 * | 4/2005 | Kamboh et al. | 709/228 |
| 2006/0129562 A1 | 6/2006 | Pulamarasetti et al. | |
| 2006/0230076 A1 | 10/2006 | Gounares et al. | |
| 2007/0027935 A1 * | 2/2007 | Haselton et al. | 707/204 |
| 2007/0239806 A1 | 10/2007 | Glover | |
| 2009/0055507 A1 | 2/2009 | Oeda | |
| 2009/0083342 A1 | 3/2009 | Tomic et al. | |
| 2009/0276771 A1 | 11/2009 | Nickolov et al. | |
| 2010/0100529 A1 | 4/2010 | Erofeev | |
| 2010/0228819 A1 | 9/2010 | Wei | |
| 2011/0314193 A1 * | 12/2011 | Kaneda et al. | 710/74 |

FOREIGN PATENT DOCUMENTS

GB 2251502 A * 7/1992

* cited by examiner

*Primary Examiner* — Syed Hasan
(74) *Attorney, Agent, or Firm* — Lieberman & Brandsdorger, LLC

(57) ABSTRACT

Embodiments of the invention relate to dynamic application migration in a shared pool of configurable computer resources with disaster recovery support. Data from an application is replicated from local data storage to remote data storage. A consistency point of the data is created in both the local data storage and the remote data storage. The application may be migrated to a second data site with separate local data storage. The migration may be planned or unplanned. Based upon the created consistency point, a consistent set of application data may be requested to support a read operation from the migrated application.

20 Claims, 8 Drawing Sheets

CONSISTENT DATA RETRIEVAL IN A MULTI-SITE COMPUTING INFRASTRUCTURE

BACKGROUND

This invention relates to dynamic application migration in a shared pool of configurable computing resources. More specifically, the invention relates to retrieval of a consistent dataset to support the application migration.

Cloud computing is a model of service delivery for enabling convenient, on-demand network access to a shared pool of configurable computer resources, e.g. networks, network bandwidth, servers, processing, memory, storage, applications, virtual machines, and services, that can be rapidly provisioned and released with minimal management effort or interaction with a provider of service. One of the characteristics of cloud computing infrastructure is that applications can be launched from a plurality of locations. Several factors drive the decision to launch an application in a specific data center, including resource availability, user location, disaster awareness, data location, and available facilities. However, the prior art cloud computing configurations do not provide flexibility of separation of the location of the data from the application location.

On another level, it is known that the current cloud computing models are not flexible with respect to disaster recovery. More specifically, it is known in the art that a failed application must recover in a designated recovery center. For example, the current models do not enable recovery based upon the factors listed above. At the same time, because current models require the entire data volume to be located local to the recovery site, the entire data set that supports the failed application must be copied to the recovery site in total before the failed application can be executed.

BRIEF SUMMARY

This invention comprises a method, system, and article for consistent data retrieval within an on-demand network accessible environment with a shared pool of configurable computing resources.

In one aspect, a method is provided for consistent data support for a migrated application. An application is processed at a first data site in communication with a first data storage, which contains a primary copy of application data to support application processing. Data is replicated from the first data storage to backup data storage while the application is running. At the same time, while the data replication processing is taking place, a consistency point of the application data is created. The application is migrated to a second data site having local second data storage. To support a read operation, the application requests consistent application data from the migrated application. This request includes receiving requested data from the second data storage if the requested data is stored in the second data storage, and receiving transferred consistent data from the backup storage if the requested data is not stored in the second data storage.

In another aspect, a system is provided with tools to support consistent data transfer for a migrated application. The system includes a shared pool of configurable computer resources, and managers to support the consistent data transfer among the resources of the shared pool. More specifically, an application manager is provided in the system to process an application at a first data site in the shared pool and in communication with a first data storage containing a primary copy of application data. In addition, a replication manager is provided in communication with the application manager, and is responsible for data replication from the first data storage to backup data storage in the shared pool while the application is running, including creation of a consistency point of the application data. A migration manager is provided to support migration of the application to a second data site having local second data storage. The migration manager requests consistent application data to support a read operation from the migrated application. This request includes receiving requested data from the second data storage if data is stored in the second data storage and receiving transferred consistent data from the backup storage if the data is not stored in the second data storage.

In a further aspect, a computer program product is delivered as a service through a network connection. The computer program product comprises a computer readable storage medium having computer readable program code embodied therewith. Computer readable program code is provided to process an application at a first data site in a shared pool of configurable computer resources and in communication with a first data storage containing a primary copy of application data. In addition, computer readable program code is provided to replicate data from the first data storage to backup data storage in the shared pool while the application is running. This data replication includes creation of a consistency point of the application data. Computer readable program code is also provided to migrate the application to a second data site in the shared pool, with the second data site having local second data storage. In addition, computer readable program code is provided to request consistent application data to support a read operation from the migrated application. The consistent data request is supported by receiving requested data from the second data storage if data is stored in the second data storage and receiving transferred consistent data from the backup storage if the data is not stored in the second data storage.

In an even further aspect, a service is provided to support retrieval of consistent data. An application is processed at a first data site in a shared pool of configurable computer resources. The application is in communication with first data storage in the pool that contains a primary copy of application data. The service supports replicating data from the first data storage to a backup data storage in the shared pool while the application is running. This includes creation of a consistency point of the application data in both the first data storage and the backup data storage. In addition, the service supports migrating the application to a second data site in the shared pool, with the second data site having second data storage. Consistent application data is maintained by the service to support a read operation from the migrated application. The maintenance of the consistent data includes receiving requested data from the second data storage if data is stored and receiving transferred consistent data from the backup storage if the data is not stored in the second data storage.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

Figure 1:
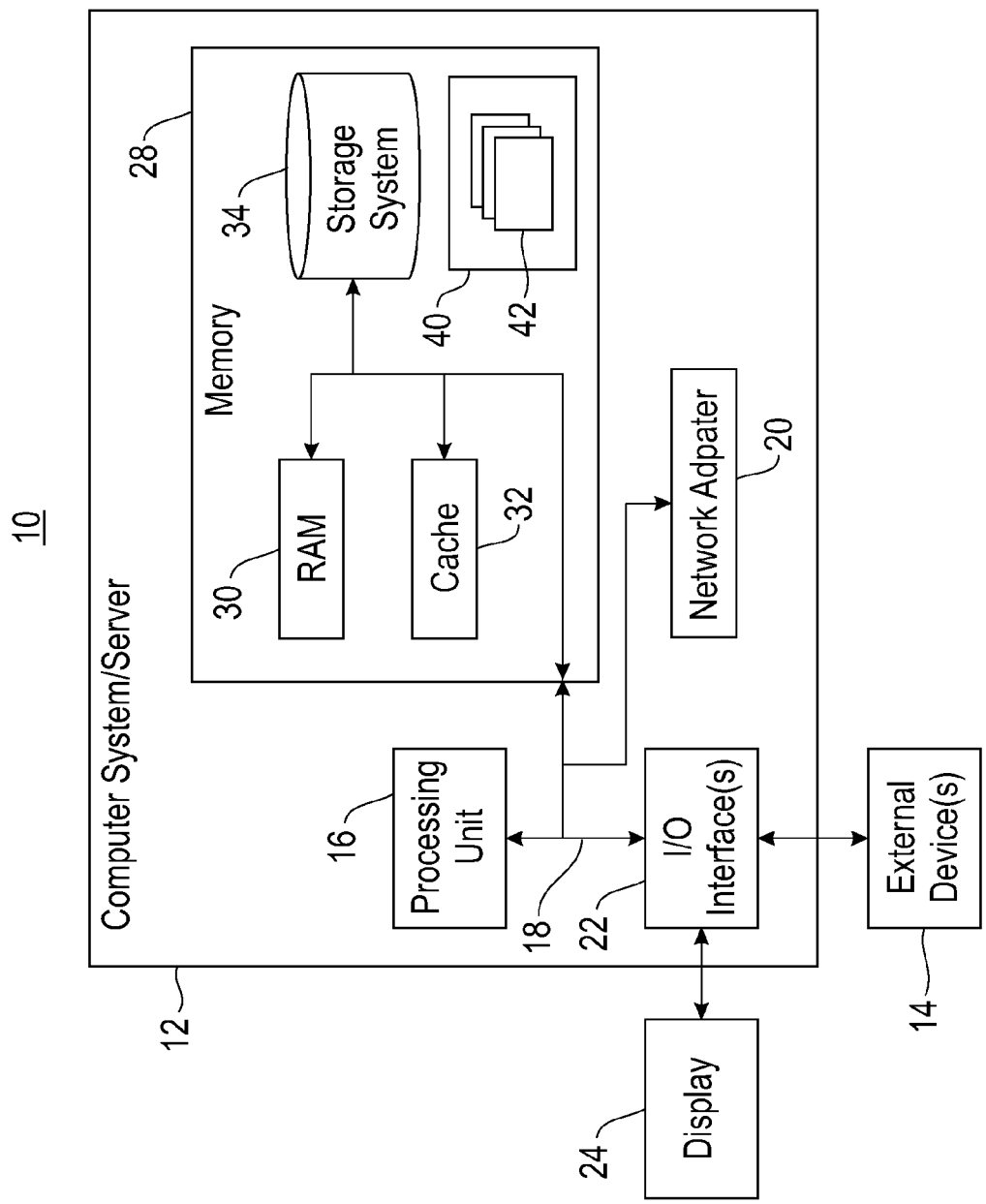
FIG. 1 depicts a cloud computing node according to an embodiment of the present invention.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers. A manager may be implemented in programmable hardware devices such as field programmable gate arrays, programmable array logic, programmable logic devices, or the like. The managers may also be implemented in software for processing by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the managers and achieve the stated purpose of the managers.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of an application manager, a replication manager, a migration manager, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

A cloud computing environment is service oriented with a focus on statelessness, low coupling, modularity, and semantic interoperability. At the heart of cloud computing is an infrastructure comprising a network of interconnected nodes. Referring now to FIG. 1, a schematic of an example of a cloud computing node is shown. Cloud computing node (10) is only one example of a suitable cloud computing node and is not intended to suggest any limitation as to the scope of use or functionality of embodiments of the invention described herein. Regardless, cloud computing node (10) is capable of being implemented and/or performing any of the functionality set forth hereinabove. In cloud computing node (10) there is a computer system/server (12), which is operational with numerous other general purpose or special purpose computing system environments or configurations. Examples of well-known computing systems, environments, and/or configurations that may be suitable for use with computer system/server (12) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (12) may be described in the general context of computer system-executable instructions, such as program modules, being executed by a computer system. Generally, program modules may include routines, programs, objects, components, logic, data structures, and so on that perform particular tasks or implement particular abstract data types. Computer system/server (12) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server (12) in cloud computing node (10) is shown in the form of a general-purpose computing device. The components of computer system/server (12) may include, but are not limited to, one or more processors or processing units (16), a system memory (28), and a bus (18) that couples various system components including system memory (28) to processor (16). Bus (18)

represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server (12) typically includes a variety of computer system readable media. Such media may be any available media that is accessible by computer system/server (12), and it includes both volatile and non-volatile media, removable and non-removable media.

System memory (28) can include computer system readable media in the form of volatile memory, such as random access memory (RAM) (30) and/or cache memory (32). Computer system/server (12) may further include other removable/non-removable, volatile/non-volatile computer system storage media. By way of example only, storage system (34) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (18) by one or more data media interfaces. As will be further depicted and described below, memory (28) may include at least one program product having a set (e.g., at least one) of program modules that are configured to carry out the functions of embodiments of the invention.

Program/utility (40), having a set (at least one) of program modules (42), may be stored in memory (28) by way of example, and not limitation, as well as an operating system, one or more application programs, other program modules, and program data. Each of the operating systems, one or more application programs, other program modules, and program data or some combination thereof, may include an implementation of a networking environment. Program modules (42) generally carry out the functions and/or methodologies of embodiments of the invention as described herein.

Computer system/server (12) may also communicate with one or more external devices (14), such as a keyboard, a pointing device, a display (24), etc.; one or more devices that enable a user to interact with computer system/server (12); and/or any devices (e.g., network card, modem, etc.) that enable computer system/server (12) to communicate with one or more other computing devices. Such communication can occur via Input/Output (I/O) interfaces (22). Still yet, computer system/server (12) can communicate with one or more networks such as a local area network (LAN), a general wide area network (WAN), and/or a public network (e.g., the Internet) via network adapter (20). As depicted, network adapter (20) communicates with the other components of computer system/server (12) via bus (18). It should be understood that although not shown, other hardware and/or software components could be used in conjunction with computer system/server (12). Examples, include, but are not limited to: microcode, device drivers, redundant processing units, external disk drive arrays, RAID systems, tape drives, and data archival storage systems, etc.

Figure 2:
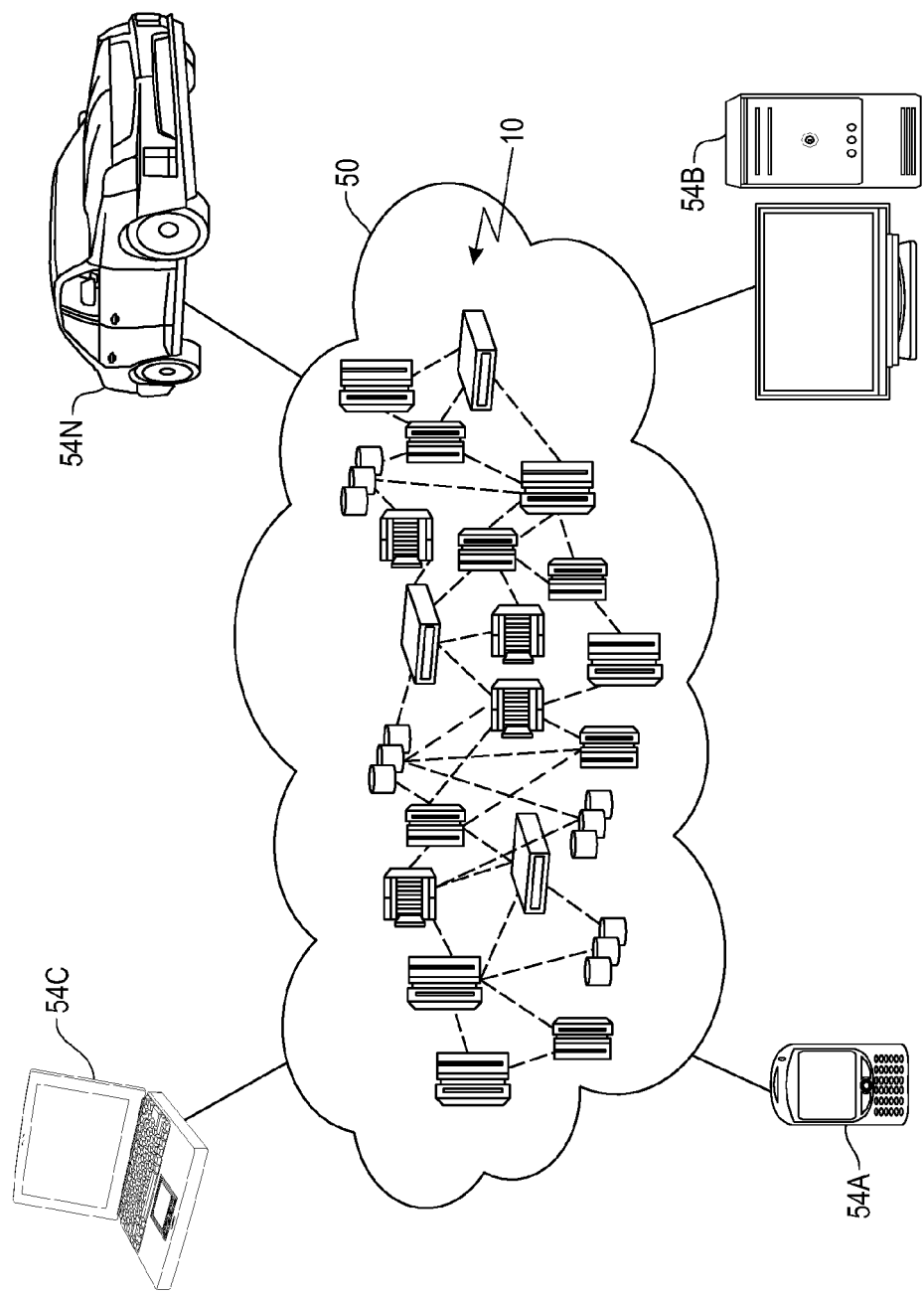
FIG. 2 depicts a cloud computing environment according to an embodiment of the present invention.

Referring now to FIG. 2, illustrative cloud computing environment (50) is depicted. As shown, cloud computing environment (50) comprises one or more cloud computing nodes (10) with which local computing devices used by cloud consumers, such as, for example, personal digital assistant (PDA) or cellular telephone (54A), desktop computer (54B), laptop computer (54C), and/or automobile computer system (54N) may communicate. Nodes (10) may communicate with one another. They may be grouped (not shown) physically or virtually, in one or more networks, such as Private, Community, Public, or Hybrid clouds as described hereinabove, or a combination thereof. This allows cloud computing environment (50) to offer infrastructure, platforms and/or software as services for which a cloud consumer does not need to maintain resources on a local computing device. It is understood that the types of computing devices (54A)-(54N) shown in FIG. 2 are intended to be illustrative only and that computing nodes (10) and cloud computing environment (50) can communicate with any type of computerized device over any type of network and/or network addressable connection (e.g., using a web browser).

Figure 3:
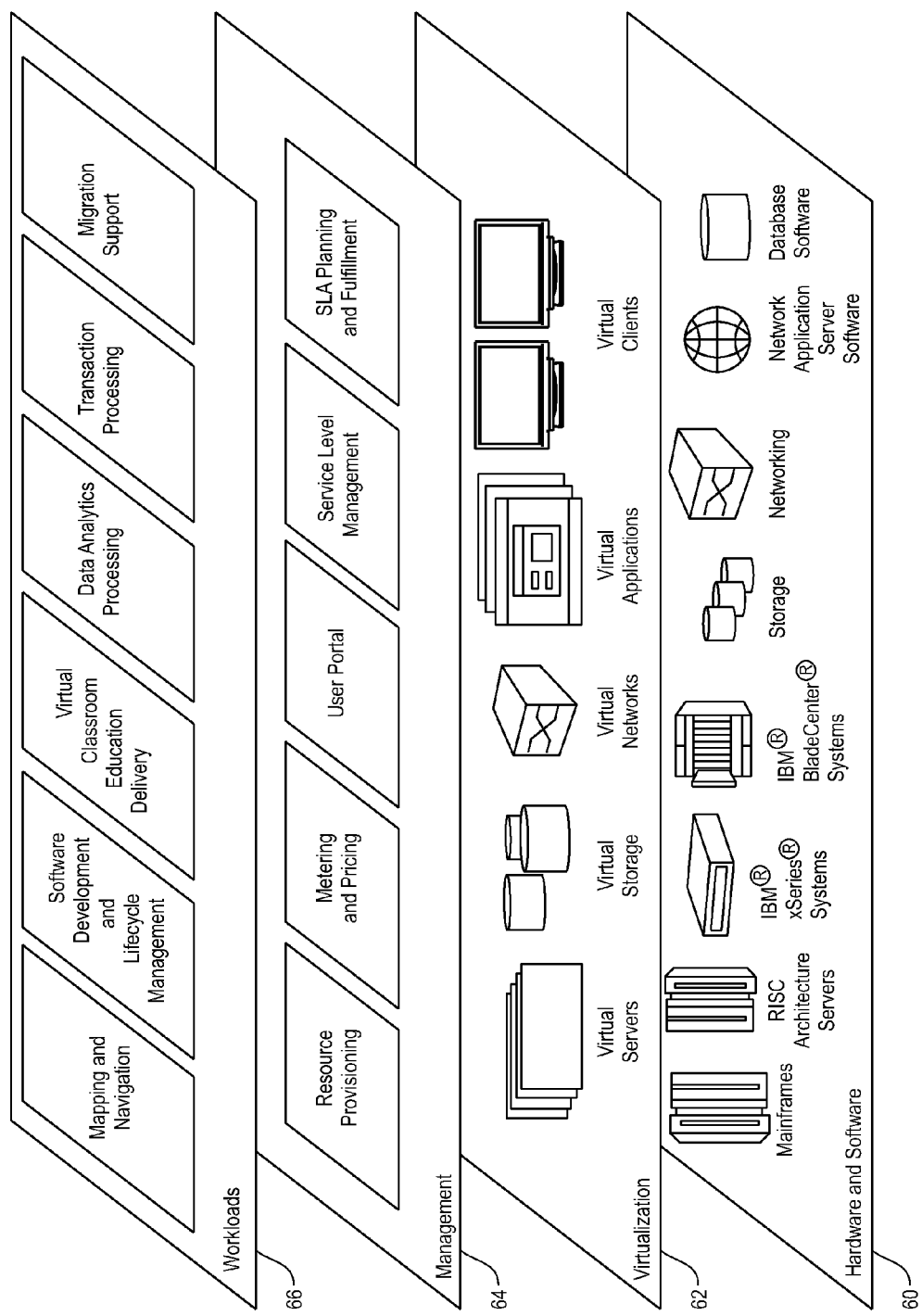
FIG. 3 depicts abstraction model layers according to an embodiment of the present invention.

Referring now to FIG. 3, a set of functional abstraction layers provided by cloud computing environment (50) (FIG. 2) is shown. It should be understood in advance that the components, layers, and functions shown in FIG. 3 are intended to be illustrative only and embodiments of the invention are not limited thereto. As depicted, the following layers and corresponding functions are provided: hardware and software layer (60), virtualization layer (62), management layer (64), and workload layer (66). The hardware and software layer (60) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (62) provides an abstraction layer from which the following examples of virtual entities may be provided: virtual servers; virtual storage; virtual networks, including virtual private networks; virtual applications and operating systems; and virtual clients.

In one example, management layer (64) may provide the following functions: resource provisioning, metering and pricing, user portal, service level management, and SLA planning and fulfillment. The functions are described below. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (66) provides examples of functionality for which the cloud computing environment may be utilized. Examples of workloads and functions which may be provided from this layer includes, but is not limited to: mapping and navigation; software development and lifecycle management; virtual classroom education delivery; data analytics processing; operation processing; and maintenance of consistent application data to support migration within the cloud computing environment.

In the shared pool of configurable computer resources described herein, hereinafter referred to as a cloud computing environment, applications may migrate to any data center, also referred to herein as a data site. There are two general scenarios in which an application is subject to migration, including a planned migration and an unplanned migration. In a planned migration, the application migrates to any data center in the cloud while maintaining disaster recovery support, and in an unplanned migration, the application is subject to failure and recovers in any data center in the cloud while maintaining disaster recovery support. Accordingly, the difference between a planned migration and an unplanned migration is the failure and subsequent recovery of a failed application.

Figure 4:
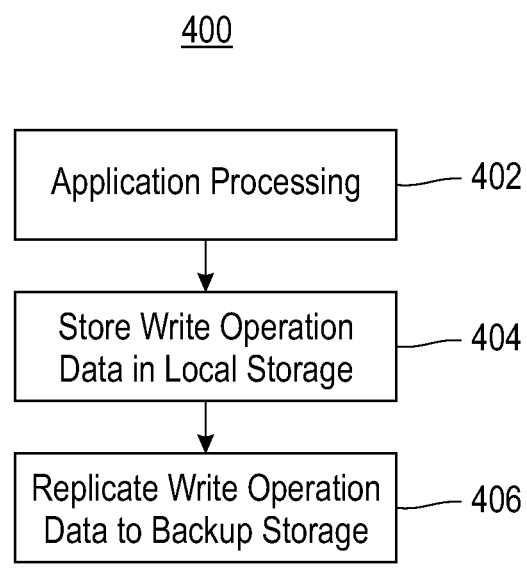
FIG. 4 depicts a flow chart illustrating steps employed for executing an application and storage of write data in a system having a shared pool of configurable computer resources.

Regardless of the planned or unplanned form of migration, both categories of migration require a minimum amount of 'critical' data to be transferred and cached to support application execution. All other 'non-critical' data is asynchronously cached in the background so as not to interfere with running applications. FIG. 4 is a flow chart (400) illustrating steps employed for executing an application and storage of write data in the shared pool of configurable computer resources, hereinafter referred to as a cloud. Specifically, an application runs at a data center in the cloud (402). The application may support read and/or write operations. Data generated from a write operation is stored in data storage local to the data center in which the application is processing, e.g. local storage (404). At the same time, the data created from the write operation is replicated from the local data storage to backup data storage at a remote data center while the application continues to process one or more operations (406). Accordingly, the process of storing and replicating write operation data, shown herein, supports disaster recovery of application data by replicating operation data from the local data storage to the backup data storage.

Figure 5:
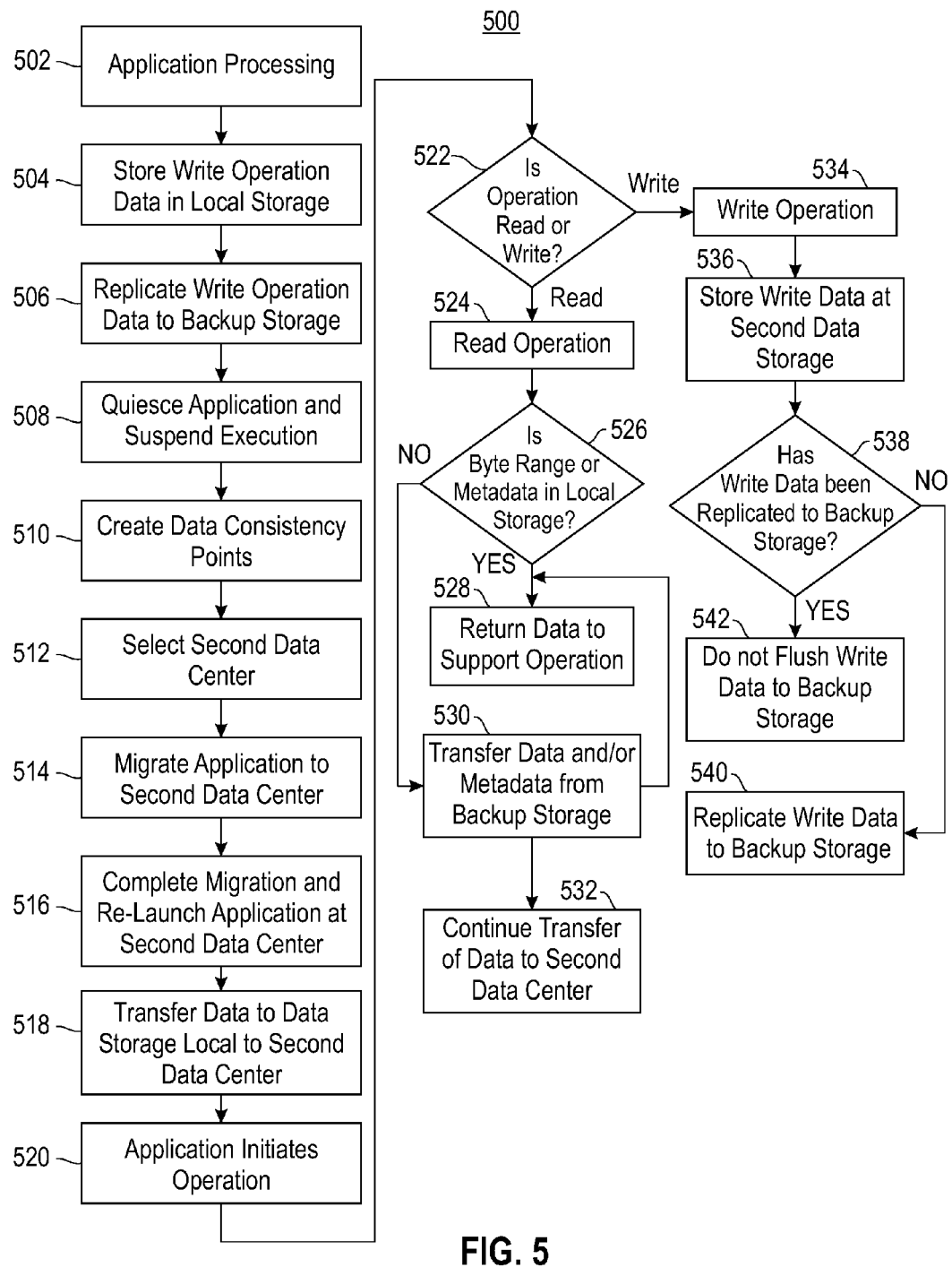
FIG. 5 depicts a flow chart illustrating the steps employed to support a planned migration of the application in the shared pool of configurable computer resources.

There are two scenarios in which an application may be subject to migration from a first data center in the cloud to a second data center in the cloud. These include a planned migration and an unplanned migration. FIG. 5 is a flow chart (500) illustrating the steps employed to support a planned migration of the application from a first data center to a second data center in the cloud computing environment. An application runs at a first data center in the cloud (502). The application may support read and/or write operations. Data generated from a write operation is stored in data storage local to the first data center in which the application is processing, e.g. local storage (504). At the same time, the data created from the write operation is replicated from the local data storage to backup data storage at a remote data center while the application continues to process one or more operations (506). The replication at step (506) includes both data and metadata from the write operation. The replication at step (506) may be conducted synchronously or asynchronously from one or more server nodes in the first data center to one or more server nodes in the backup data storage. Regardless of the format of the replication at step (506), a data consistency point is created on both the local and backup data storage. The creation of the consistency point ensures that should the application be subject to a failure, the application can recover from a consistent data set. A consistency point can be achieved using several different methods known to someone skilled in the art. In one embodiment, a file system or storage system snapshot is taken and copy-on-write semantics are employed to save data at a certain point in time without delaying application requests for an extended period of time. In one embodiment, any level of consistency can be used, including, but not limited to, application, crash, file system, etc. Accordingly, data and metadata from one or more write operations are stored in local data storage and replicated to backup data storage, with creation of one or more consistency points in both data storage locations.

For a planned application migration, the application is quiesced and execution is suspended (508) at the first data center prior to migration and a consistency point is created (510). Following step (510), a second data center separate from the first data center is selected (512), and the application is migrated to the selected second data center (514). Following migration of the application at step (514), the application is unquiesced and re-launched at the second data center (516), and data is transferred from the backup data storage to data storage local to the second data center (518). Although the application can process read operations with data from the backup data storage, it is more efficient to process the operations from local data storage.

Once the application is re-launched it can support both read and write operations. When the application initiates operation processing (520), it is determined if the operation is a read operation or a write operation (522). Following determination of a read operation (524), it is further determined if the data byte-range or file system metadata to support the operation has already been transferred from the backup data storage (526). If at step (526) it is determined that the data or metadata exists in the local data storage, the data is returned to the application to support the read operation (528). Conversely, if at step (526) it is determined that the data or metadata is not present in the local data storage, data and/or metadata to support the read operation is transferred from the backup data storage to the second data storage local to the migrated application (530), followed by a return to step (528) where the data is returned to the application to support the read operation. In the interim, transfer of data from the backup storage to the second data storage continues (532). Accordingly, as shown herein data and/or metadata to support a read operation is initially sought at local data storage, and if not present, from backup data storage at a remote location.

Steps (522)-(528) demonstrate processing of a read operation for a migrated application. In addition to read operations, the application may also support and process write operations. Following a determination of a write operation (534), the application stores write data at the second data storage (536). As shown in FIG. 4, data is replicated from local storage to backup storage prior to migration. For a migrated application, the data replication to the backup storage takes place as well, but only for data that has not been previously replicated to the backup storage. Following step (536), it is determined if the write data generated by the application has been previously replicated to the backup storage (538). A negative response to the determination at step (538) is followed by replication of the generated and non-previously replicated write data to the backup storage (540). However, a positive response to the determination at step (538) is an indication that the generated write data is a duplicate of previously replicated data, and as such, the generated write data is not flushed to the backup storage (542). Accordingly, the process of writing data to local storage and replicating the data to the backup storage is a closed loop data storage and replication system.

Figure 6:
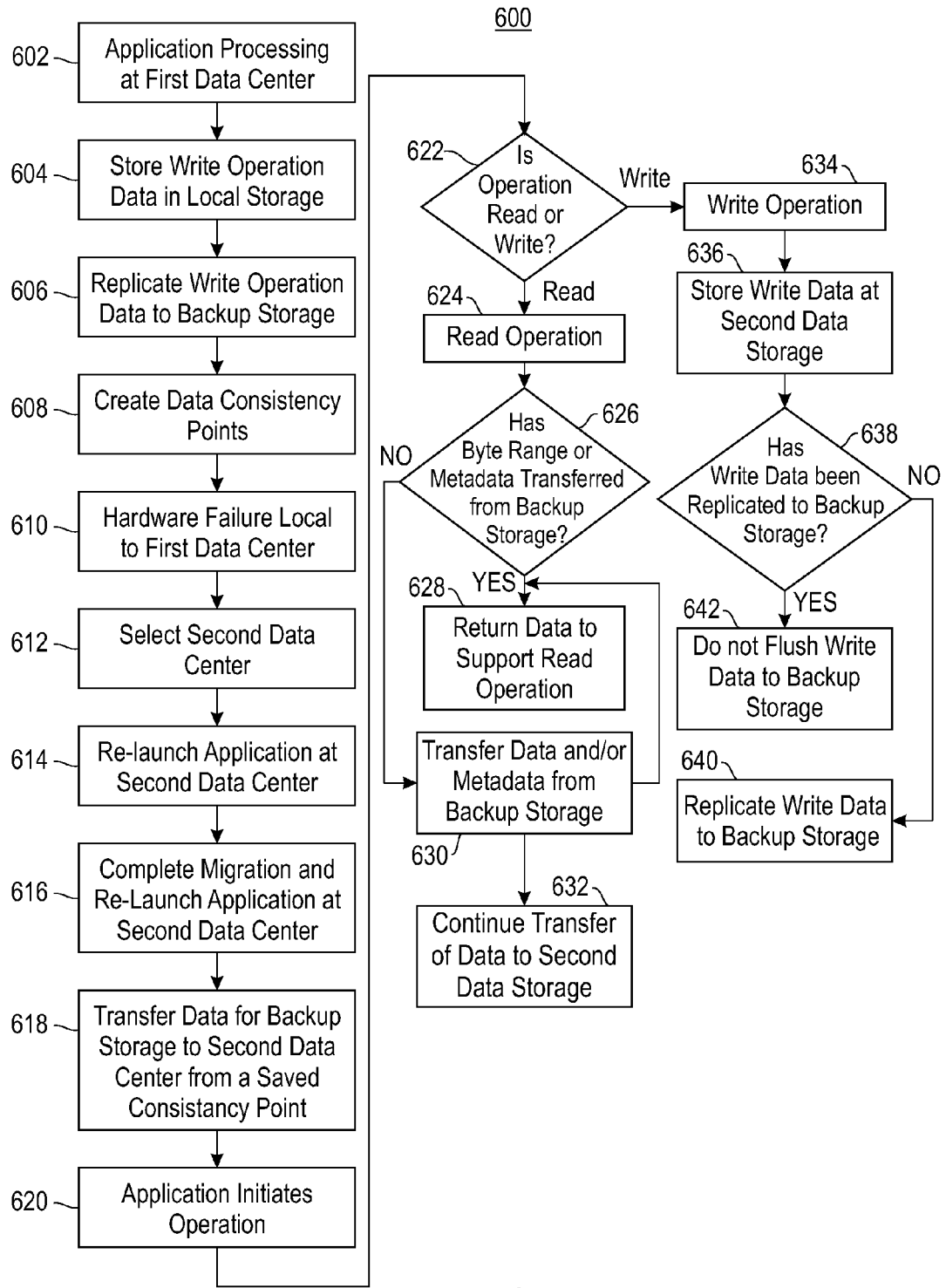
FIG. 6 depicts a flow chart illustrating a process of an unplanned migration of an application in the shared pool of configurable computer resources.

As described above, migration of an application across data centers may be planned or unplanned. FIG. 5 illustrates the process of a planned application migration. FIG. 6 is a flow chart (600) illustrating a process of an unplanned migration of an application from a first data center to a second data center. An application runs at a first data center in the cloud (602). The application may support read and/or write operations. Data generated from a write operation is stored in data storage local to the first data center in which the application is processing, e.g. local storage (604). At the same time, the data created from the write operation is replicated from the local data storage to backup data storage at a remote data center while the application continues to process one or more operations (606). The replication at step (606) includes both data and metadata from the write operation. The replication at step (606) may be conducted synchronously or asynchronously from one or more server nodes in the first data center to one or more server nodes in the backup data storage. Regardless of the format of the replication at step (606), a consistency point is created on both local and backup data storage (608). The creation of the consistency points ensures that should the application be subject to a failure, the application can recover from a consistent data set. In one embodiment, any level of consistency can be used, including, but not limited to, application, crash, file system, etc. There are different techniques that may be employed to create the consistent data set, including, but not limited to restoring a previous snapshot of the data set. Accordingly, data and metadata from one or more write operations are stored in local data storage and replicated to backup data storage, with creation of one or more consistency points in both data storage locations.

For an unplanned application migration, there is no quiescing of the application or suspension of application execution. Rather, an unplanned application migration follows an unexpected failure of the hardware local to the first data center (610). In one embodiment, the hardware failure may be the local data storage of the first data center. Prior to migration of the application to a different data center, a second data center separate from the first data center is selected for migration (612) and the application is re-launched in the selected second data center (614). Accordingly, in a planned migration, the application affected by the hardware failure is re-launch at a different data center.

Once the migration is completed, the application is re-launched at the second data center (616). In one embodiment, the saved consistency point is restored so that the associated dataset can be accessed and modified by the second storage system of the second data center. Following the re-launch at step (616), data is transferred from the backup data storage to data storage local to the second data center (618). The data transfer at step (618) is from a saved consistency point in the backup data storage. Although the application can process read operations with data from the backup data storage, it is more efficient to process the operations from local data storage. The re-launched application can support both read and write operations. When the application initiates operation processing (620), it is determined if the operation is a read operation or a write operation (622). Following determination of a read operation (624), it is determined if the data byte-range or file system metadata to support the operation has already been transferred from the backup data storage (626). If at step (626) it is determined that the data or metadata exists in the local data storage, the data is returned to the application to support the read operation (628). Conversely, if at step (626) it is determined that the data or metadata is not present in the local data storage, data and/or metadata to support the read operation is transferred from the backup data storage to the second data storage local to the migrated application (630), followed by a return to step (628) where the data is returned to the application to support the read operation. In the interim transfer of data from the backup storage to the second data storage continues (632). Accordingly, as shown herein data and/or metadata to support a read operation is initially sought at local data storage, and if not present, from backup data storage at a remote location.

However, following determination of a write operation (634), the application stores write data at the second data storage (636). As shown in FIG. 4, data is replicated from local storage to backup storage prior to migration. For a migrated application, the data replication to the backup storage takes place as well, but only for data that has not been previously replicated to the backup storage. Following step (636), it is determined if the write data generated by the application has been previously replicated to the backup storage (638). A negative response to the determination at step (638) is followed by replication of the generated and non-previously replicated write data to the backup storage (640). However, a positive response to the determination at step (638) is an indication that the generated write data is a duplicate of previously replicated data, and as such, the generated write data is not flushed to the backup storage (642). Accordingly, the process of writing data to local storage and replicating the data to the backup storage is a closed loop data storage and replication system.

Figure 7:
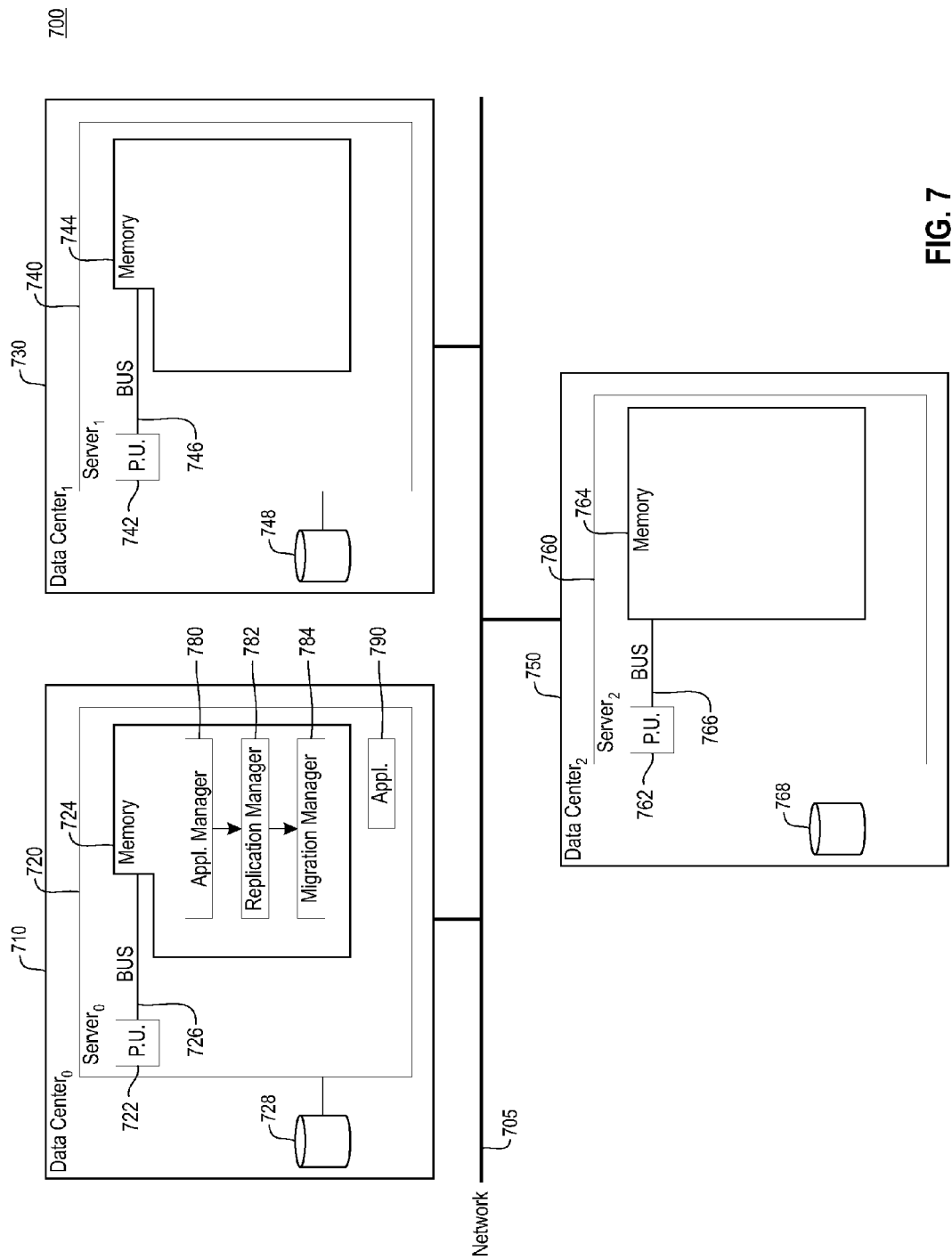
FIG. 7 depicts a block diagram illustrating tools embedded in a computer system to support both planned and unplanned migration of the application in the shared pool of configurable computer resources.

As demonstrated in the flow charts of FIGS. 4-6, a method is employed to support planned and unplanned migration of an application from a first data center to a second data center, both forms of migration supported maintaining disaster recovery support through creation of one or more consistency points on the backup data storage. Similarly, following the conclusion of either of the planned migration or unplanned migration illustrated in FIGS. 5 and 6, respectively, application processing continues with data replication and creation of consistency points. FIG. 7 is a block diagram (700) illustrating tools embedded in a computer system to support both planned and unplanned migration of the application across data centers. More specifically, a shared pool of configurable computer resources is shown with a first data center (710), a second data center (730), and a third data center (750). In one embodiment, the third data center (750) may be referred to as a backup data center. Although three data centers are shown in the example herein, the invention should not be limited to this quantity of data centers in the computer system. Accordingly, three or more data centers may be employed to support dynamic application migration.

Each of the data centers in the system is provided with at least one server in communication with data storage. More specifically, the first data center (710) is provided with a server (720) having a processing unit (722), in communication with memory (724) across a bus (726), and in communication with first local storage (728); the second data center (730) is provided with a server (740) having a processing unit (742), in communication with memory (744) across a bus (746), and in communication with second local storage (748); the third data center (750) is provided with a server (760) having a processing unit (762), in communication with memory (764) across a bus (766), and in communication with third local storage (768). Both server (720) and server (740) may separately communicate with the third local storage (768) across a network connection (705).

In the example shown herein, an application (790) processes read and write operations local to the first data center (710). Read operations are supported with data in the first local storage (728), and if the data is not present therein, with data in the third local storage (768). Similarly, data from write operations are written to the first local storage (728), and non-duplicate data is replicated to the third local storage (768). Several tools are provided to support both planned and unplanned migration of the application from the first data center (710) to the second data center (730). More specifically, an application manager (780) is provided to process the application (790) at the first data center (710) in the shared pool. The application manager (780) communicates with a replication manager (782). More specifically, the replication manager (782) replicates data from the first local storage (728) to the third local storage (768) in the shared pool while the application (790) is running. As described above to support both planned and unplanned migration, one or more consistency points must be maintained in both the first and third local storage (728) and (768), respectively. The replication manager (782) is responsible for creation of one or more consistency points of the application data in both the first local storage (728) and the third local storage (768). Furthermore, the replication manager supports either synchronous or asynchronous replication of data in the cloud environment. Accordingly, the replication manager (782) communicates with the application manager (780) to manage and support creation of consistency points in the stored data.

In addition to the application and replication managers, (780) and (782) respectively, a migration manager (784) is provided to migrate the application from the first data center (710) to the second data center (720). The migration manager (784) plans migration of the application (790), including quiescing the application (790) and suspending execution of the application (790) prior to migration to the second data center (730), and unquiescing the application (790) following completion of the migration to the second data center (730). As shown, the second data center (730) is separate from the first data center (710). The migration manager (784) communicates with both the application manager (780) and the replication manager (782). More specifically, the migration manager (784) requests consistent application data to support a read operation from the migrated application (790), including receiving requested data from the second local storage (748) if data is present and receiving transferred consistent data from the third local storage (768) if the data is not present in the second local storage (748). To support the consistent data request, the migration manager (784) checks either a data byte range or file system metadata, and further mitigates transfer of replicated data. The transfer limits are applied to both ensure that data is replicated only one time as well as limit transfer of the consistent data to a single transfer. Accordingly, a consistent state of the data is maintained across the first and second data centers, (710) and (730) respectively, to allow failover.

As shown herein, migration of the application (790) is supported by the application, replication, and migration managers, (780), (782), and (784) respectively, for both planned and unplanned migration scenarios. In one embodiment, an unplanned migration scenario occurs in response to a failure of a processing element at the first data center (710) and recovery of the processing element. Tools are provided in the shared pool of configurable computer resources, i.e. cloud, to restore the processing element from a saved consistency point prior to execution of the processing element. As described above, the processing element may be an application executing on the processing unit (722). However, the invention should not be limited to an application. In one embodiment, the processing element may be a virtual machine operating in the data center.

As identified above, the application, replication, and migration managers, (780), (782), and (784) respectively, are shown residing in memory (724) of the server (720) local to the first data center (710). Although in one embodiment, the application, replication, and migration managers, (780), (782), and (784) respectively, may reside as hardware tools external to memory (724) of server (720), or they may be implemented as a combination of hardware and software. Similarly, in one embodiment, the managers may be combined into a single functional item that incorporates the functionality of the separate items. As shown herein, each of the manager(s) are shown local to one data center. However, in one embodiment they may be collectively or individually distributed across the shared pool of configurable computer resources and function as a unit to manage dynamic application migration with disaster recovery support. Accordingly, the managers may be implemented as software tools, hardware tools, or a combination of software and hardware tools.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
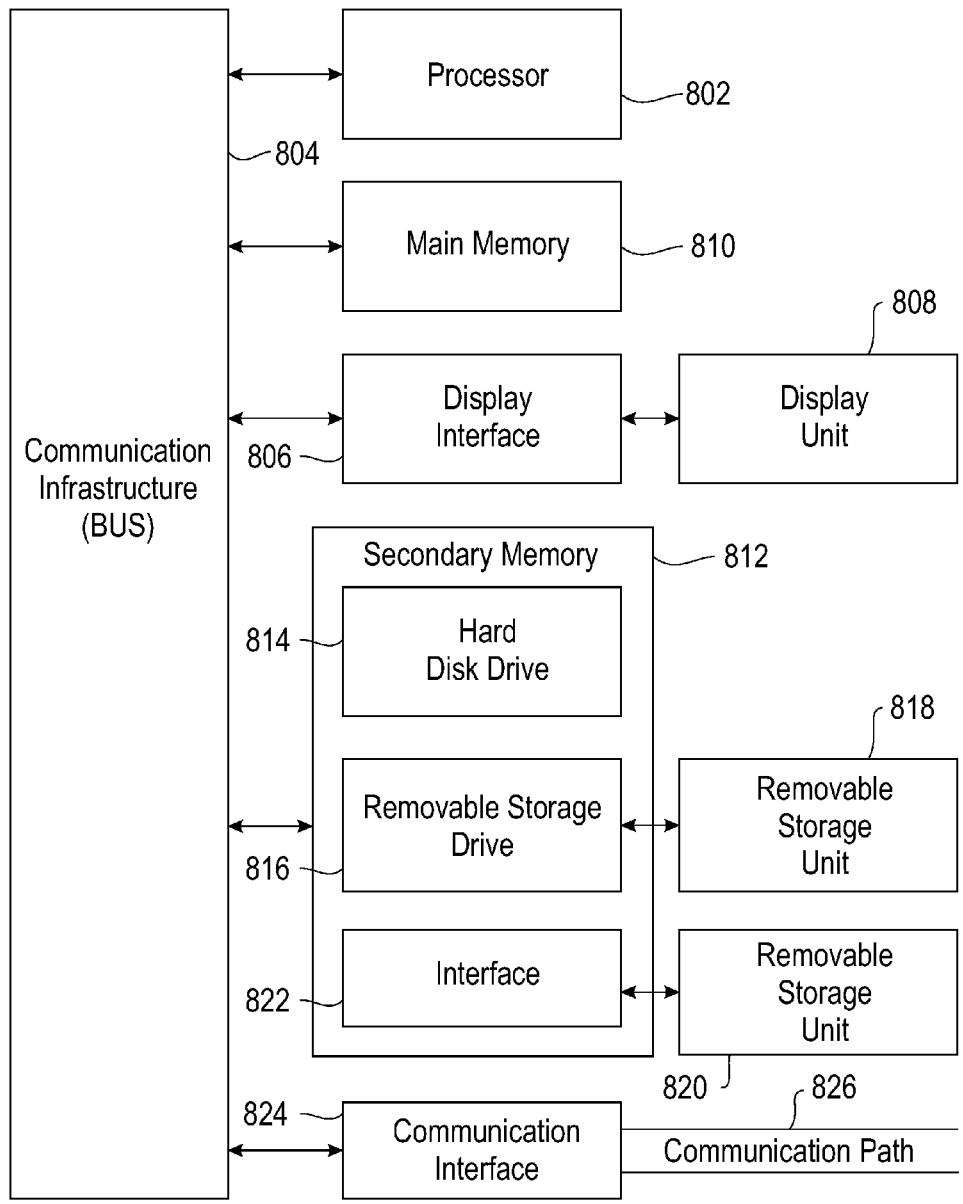
FIG. 8 depicts is a block diagram showing a system for implementing an embodiment of the present invention.

Referring now to FIG. 8 is a block diagram (800) showing a system for implementing an embodiment of the present invention. The computer system includes one or more processors, such as a processor (802). The processor (802) is connected to a communication infrastructure (804) (e.g., a communications bus, cross-over bar, or network). The computer system can include a display interface (806) that forwards graphics, text, and other data from the communication infrastructure (804) (or from a frame buffer not shown) for display on a display unit (808). The computer system also includes a main memory (810), preferably random access memory (RAM), and may also include a secondary memory (812). The secondary memory (812) may include, for example, a hard disk drive (814) and/or a removable storage drive (816), representing, for example, a floppy disk drive, a magnetic tape drive, or an optical disk drive. The removable storage drive (816) reads from and/or writes to a removable storage unit (818) in a manner well known to those having ordinary skill in the art. Removable storage unit (818) represents, for example, a floppy disk, a compact disc, a magnetic tape, or an optical disk, etc., which is read by and written to by removable storage drive (816). As will be appreciated, the removable storage unit (818) includes a computer readable medium having stored therein computer software and/or data.

In alternative embodiments, the secondary memory (812) may include other similar means for allowing computer programs or other instructions to be loaded into the computer system. Such means may include, for example, a removable storage unit (820) and an interface (822). Examples of such means may include a program package and package interface (such as that found in video game devices), a removable memory chip (such as an EPROM, or PROM) and associated socket, and other removable storage units (820) and interfaces (822) which allow software and data to be transferred from the removable storage unit (820) to the computer system.

The computer system may also include a communications interface (824). Communications interface (824) allows software and data to be transferred between the computer system and external devices. Examples of communications interface (824) may include a modem, a network interface (such as an Ethernet card), a communications port, or a PCMCIA slot and card, etc. Software and data transferred via communications interface (824) are in the form of signals which may be, for example, electronic, electromagnetic, optical, or other signals capable of being received by communications interface (824). These signals are provided to communications interface (824) via a communications path (i.e., channel) (826). This communications path (826) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (810) and secondary memory (812), removable storage drive (816), and a hard disk installed in hard disk drive (814).

Computer programs (also called computer control logic) are stored in main memory (810) and/or secondary memory (812). Computer programs may also be received via a communication interface (824). Such computer programs, when run, enable the computer system to perform the features of the present invention as discussed herein. In particular, the computer programs, when run, enable the processor (802) to perform the features of the computer system. Accordingly, such computer programs represent controllers of the computer system.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the enhanced cloud computing model supports flexibility with respect to application processing and disaster recovery, including, but not limited to, supporting separation of the location of the data from the application location and selection of an appropriate recovery site.

Alternative Embodiment

It will be appreciated that, although specific embodiments of the invention have been described herein for purposes of illustration, various modifications may be made without departing from the spirit and scope of the invention. In particular, the system can be configured to support planned and unplanned migration of a virtual machine operating at the first data center. The virtual machine needs to ensure that a consistent and usable data set is transferred to the third data center as backup data storage. To recover a virtual machine from a failed data center, a virtual machine restore from a saved consistency point is performed on a data set prior to the virtual machine execution. Accordingly, the scope of protection of this invention is limited only by the following claims and their equivalents.

We claim:

1. A method comprising:
    executing write operations by an application at a first data site and in communication with a first data storage containing a primary copy of application data;
    copying write data from the first data storage to a backup data storage while the application executes one or more operations;
    creating a consistency point of the application data in both the first data storage and the backup data storage;
    migrating the application to a second data site having local second data storage; and
    requesting consistent application data to support a read operation from the migrated application, including continuously transferring data from the backup data storage to the second data storage and receiving requested data from the second data storage if the requested data is stored in the second data storage and receiving transferred consistent data from the backup storage if the requested data is not stored in the second data storage.

2. The method of claim 1, further comprising a failure of a processing element at the first data site and recovery of the processing element, including restoring the processing element from a saved consistency point prior to execution of the processing element.

3. The method of claim 2, wherein the processing element is selected from the group consisting of: a virtual machine and the processed application.

4. The method of claim 2, further comprising software to support recovery of the processing element in a cloud computing environment.

5. The method of claim 1, wherein replication of data is performed synchronously or asynchronously.

6. The method of claim 1, further comprising planning migration of the application, including quiescing the application and suspending execution of the application prior to migration to the second data site.

7. The method of claim 1, wherein requesting consistent data to support the read operation includes checking an item selected from the group consisting of: a data byte range and file system metadata.

8. The method of claim 1, further comprising writing data from the migrated application to the second data storage and replicating non-previously replicated write data from the second data storage to the backup storage.

9. A system comprising:
    a shared pool of configurable computer resources;
    a tool in communication with the resources, the tool configured to support a consistency with respect to replication, including:
    execute write operations by an application at a first data site in the shared pool and in communication with a first data storage containing a primary copy of application data;
    copy write data from the first data storage to a backup data storage in the shared pool while the application executes one or more operations;
    create a consistency point of the application data in both the first data storage and the backup data storage;
    migrate the application to a second data site having local second data storage; and
    request consistent application data to support a read operation from the migrated application, including continuously transferring data from the backup data storage to the second data storage and receiving requested data from the second data storage if the requested data is stored in the second data storage and receiving transferred consistent data from the backup storage if the requested data is not stored in the second data storage.

10. The system of claim 9, further comprising a failure of a processing element at the first data site and recovery of the processing element, including providing software in a cloud environment to restore the processing element from a saved consistency point prior to execution of the processing element.

11. The system of claim 10, wherein the requesting of consistent data to support the read operation includes checking an item selected from the group consisting of: a data byte range and file system metadata.

12. The system of claim 10, further comprising limit transfer of replicated data, including limit transfer of the consistent data to a single transfer.

13. The system of claim 9, wherein replication of data is performed synchronously or asynchronously.

14. The system of claim 9, further comprising the tool to plan migration of the application, including quiesce the application and suspend execution of the application prior to migration to the second data site.

15. A computer program product comprising a computer readable storage device having computer readable program code embodied therewith, the computer readable program code comprising:
  computer readable program code configured to execute write operations by an application at a first data site in a shared pool of configurable computer resources and in communication with a first data storage containing a primary copy of application data;
  computer readable program code configured to copying write data from the first data storage to a backup data storage in the shared pool while the application executes one or more operations;
  computer readable program code configured to create of a consistency point of the application data in both the first data storage and the backup data storage;
  computer readable program code configured to migrate the application to a second data site in the shared pool having local second data storage; and
  computer readable program code configured to request consistent application data to support a read operation from the migrated application, including continuously transferring data from the backup data storage to the second data storage and receiving requested data from the second data storage if the requested data is stored in the second data storage and receiving transferred consistent data from the backup storage if the requested data is not stored in the second data storage.

16. The computer program product of claim 15, further comprising code configured to restore a failed processing element at the first data site and to support recovery of the processing element, including restoring the processing element from a saved consistency point prior to execution of the processing element, wherein the processing element is selected from the group consisting of: a virtual machine and the processed application.

17. The computer program product of claim 16, wherein the code to request consistent data to support the read operation includes checking an item selected from the group consisting of: a data byte range and file system metadata.

18. The computer program product of claim 15, wherein replication of data is performed by the replication code synchronously or asynchronously.

19. The computer program product of claim 15, further comprising the code to plan migration of the application, including the code to quiesce the application and to suspend execution of the application prior to migration to the second data site.

20. A service to support retrieval of consistent data, comprising:
  using a processing unit, executing write operations by an application at a first data site in a shared pool of configurable computer resources and in communication with a first data storage in the pool and containing a primary copy of application data;
  copying write data from the first data storage to a backup data storage in the shared pool while the application executes one or more operations;
  creating a consistency point of the application data in both the first data storage and the backup data storage;
  migrating the application to a second data site in the shared pool having second data storage; and
  consistent application data to support a read operation from the migrated application, including continuously transferring data from the backup data storage to the second data storage and receiving requested data from the second data storage if the requested data is stored and receiving transferred consistent data from the backup storage if the requested data is not stored in the second data storage.

* * * * *